(12) United States Patent
Minamikawa et al.

(10) Patent No.: US 11,922,086 B2
(45) Date of Patent: Mar. 5, 2024

(54) PRINTING SYSTEM INCLUDING DATA PROCESSING SERVER AND PRINTING DEVICE TO TRANSMIT PRINT JOB TO THE DATA PROCESSING SERVER

(71) Applicant: BROTHER KOGYO KABUSHIKI KAISHA, Nagoya (JP)

(72) Inventors: Shunsuke Minamikawa, Nagoya (JP); Tetsuya Okuno, Nagoya (JP); Haruka Azechi, Nagoya (JP); Ayaka Hotta, Kitanagoya (JP); Yushi Deura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/935,762

(22) Filed: Sep. 27, 2022

(65) Prior Publication Data

US 2023/0014099 A1 Jan. 19, 2023

Related U.S. Application Data

(63) Continuation of application No. PCT/JP2021/010551, filed on Mar. 16, 2021.

(30) Foreign Application Priority Data

Mar. 31, 2020 (JP) .................. 2020-064939

(51) Int. Cl.
G06F 3/12 (2006.01)

(52) U.S. Cl.
CPC .......... *G06F 3/1296* (2013.01); *G06F 3/1203* (2013.01); *G06F 3/1238* (2013.01); *G06F 3/1267* (2013.01); *G06F 3/1288* (2013.01)

(58) Field of Classification Search
None
See application file for complete search history.

(56) References Cited

U.S. PATENT DOCUMENTS

| 2012/0147420 A1* | 6/2012 | Nishimi ............... G06F 3/1292 358/1.15 |
| 2018/0213115 A1 | 7/2018 | Sun et al. |
| 2020/0167112 A1* | 5/2020 | Oshima ................ G06F 3/1267 |

FOREIGN PATENT DOCUMENTS

| JP | 2012049921 A | 3/2012 |
| JP | 2012138073 A | 7/2012 |

(Continued)

OTHER PUBLICATIONS

International Search Report dated Jun. 15, 2021 issued in PCT/JP2021/010551.

(Continued)

*Primary Examiner* — Lennin R Rodriguezgonzalez
(74) *Attorney, Agent, or Firm* — Scully, Scott, Murphy & Presser, PC

(57) ABSTRACT

A printing system includes a printing device and a data processing server. The printing device includes a first controller. The data processing server includes a second controller. The first controller acquires a print job from an external device and transmits the print job to the server. The second controller receives the print job and stores the print job in a server memory. The first controller receives designation of the print job subject to printing and transmits a print request for printing the print job subject to printing to the server. After a fee payment approval to approve a payment for execution of the designated print job is transmitted, the second controller transmits to the printing device the print job. The first controller receives the print job and (Continued)

performs printing the print job on a print medium by controlling a printing member.

21 Claims, 10 Drawing Sheets

(56) References Cited

FOREIGN PATENT DOCUMENTS

| | | |
|---|---|---|
| JP | 2017058846 A | 3/2017 |
| JP | 2018118406 A | 8/2018 |

OTHER PUBLICATIONS

International Preliminary Report on Patenability and Written Opinion dated Sep. 29, 2022 issued in PCT/JP2021/010551 together with English language translation.
Japanese Reasons for Refusal dated Dec. 1, 2023 from related JP 2020-064939 together with English language translation.

* cited by examiner

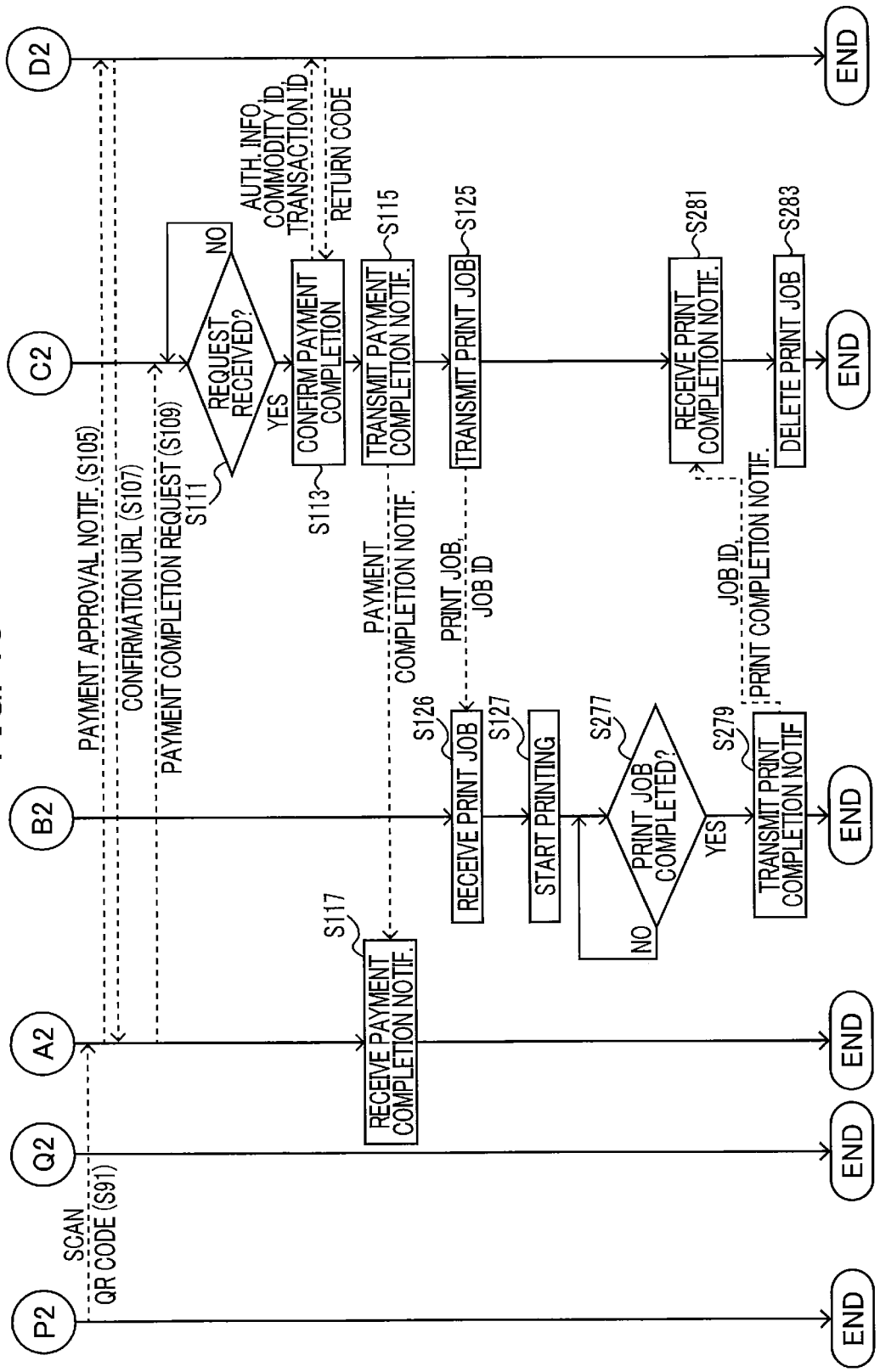

PRINTING SYSTEM INCLUDING DATA PROCESSING SERVER AND PRINTING DEVICE TO TRANSMIT PRINT JOB TO THE DATA PROCESSING SERVER

REFERENCE TO RELATED APPLICATIONS

This application is a by-pass continuation application of International Application No. PCT/JP2021/010551 filed Mar. 16, 2021 claiming priority from Japanese Patent Application No. 2020-064939 filed Mar. 31, 2020. The entire contents of the international application and the priority application are incorporated herein by reference.

BACKGROUND ART

In a conventional document printing system, a multifunction peripheral (MFP) receives print data from an external electronic device and stores that print data. When the print data is subsequently selected by a user, the MFP transmits the print data to a computer for calculating the required fee. Once the fee has been paid, the MFP prints the data.

DESCRIPTION

In the conventional document printing system described above, the MFP stores print data and subsequently waits for a user selection before sending the selected print data to a computer to settle the payment. Consequently, the MFP must be equipped with a high-capacity memory.

In view of the foregoing, it is an object of the present disclosure to provide a printing system, a printing device, and a non-transitory computer readable storage medium storing a printing program capable of transmitting print jobs from an external device to a data processing server to settle payment and to execute a print on the printing device without requiring a high-capacity memory in the printing device.

In order to attain the above and other object, the present disclosure provides a printing system. The printing system includes a printing device and a data processing server. The printing device includes a printing member, an operation interface, and a first controller. The printing member is configured to perform printing on a print medium. The data processing server includes a server memory and a second controller. The first controller is configured to perform: a print job acquisition process to acquire a print job from an external device; and a first print job transmitting process to transmit the print job to the data processing server in response to acquiring the print job. The second controller is configured to perform: a first print job receiving process to receive the print job which is transmitted in the first print job transmitting process; and a print job storing process to store the print job received in the first print job receiving process in the server memory. The first controller is configured to further perform: a designation receiving process to receive designation of the print job subject to printing via the operation interface; and a print request transmitting process to transmit a print request for printing the print job subject to printing designated in the designation receiving process to the data processing server. The second controller is configured to further perform: a second print job transmitting process, after a fee payment approval to approve a payment for execution of the designated print job is transmitted, to transmit to the printing device the print job which is designated in the designation receiving process and stored in the server memory. The first controller is configured to further perform: a second print job receiving process to receive the print job which is transmitted in the second print job transmitting process; and a print process to perform printing the print job, which is received in the second print job receiving process, on a print medium by controlling the printing member.

According to another aspect, the disclosure provides a printing device. The printing device includes a printing member, an operation interface, and a controller. The printing member is configured to perform printing on a print medium. The controller is configured to perform: a print job acquisition process to acquire a print job from an external device; a print job transmitting process to transmit the print job to a data processing server in response to acquiring the print job; a designation receiving process to receive designation of the print job subject to printing via the operation interface; a print request transmitting process to transmit a print request for printing the print job subject to printing designated in the designation receiving process to the data processing server; a print job receiving process, after a fee payment approval to approve a payment for execution of the designated print job is transmitted, to receive the print job which is transmitted from the data processing server; and a print process to perform printing the print job, which is received in the print job receiving process, on a print medium by controlling the printing member.

According to another aspect, the disclosure provides a non-transitory computer readable storage medium storing a set of program instructions executed by a computer in a printing device. The printing device includes a printing member configured to perform printing on a print medium, and an operation interface. The set of program instructions includes: acquiring a print job from an external device; transmitting the print job to a data processing server in response to acquiring the print job; receiving designation of the print job subject to printing via the operation interface; and transmitting a print request for printing the print job subject to printing designated in the receiving designation; receiving, after a fee payment approval to approve a payment for execution of the designated print job is transmitted, the print job which is transmitted from the data processing server; and printing the print job, which is received in the receiving the print job, on a print medium by controlling the printing member.

With the above structure, printing operation can be performed by transmitting the print job to the data processing server from the external device without providing the printing device with a memory having a large capacity.

FIG. 10 is a sequence chart illustrating a process executed by the PC, the mobile terminal, the multifunctional peripheral, the data processing server, and the transaction server continued from the sequence chart of FIG. 7.

FIG. 1 shows a printing system according to a present embodiment. In the present embodiment, a printing system 1 provides a print service to users, i.e., customers who pay a fee to use the printing function of a multifunction peripheral 200.

OVERVIEW OF THE PRINTING SYSTEM

Figure 1:
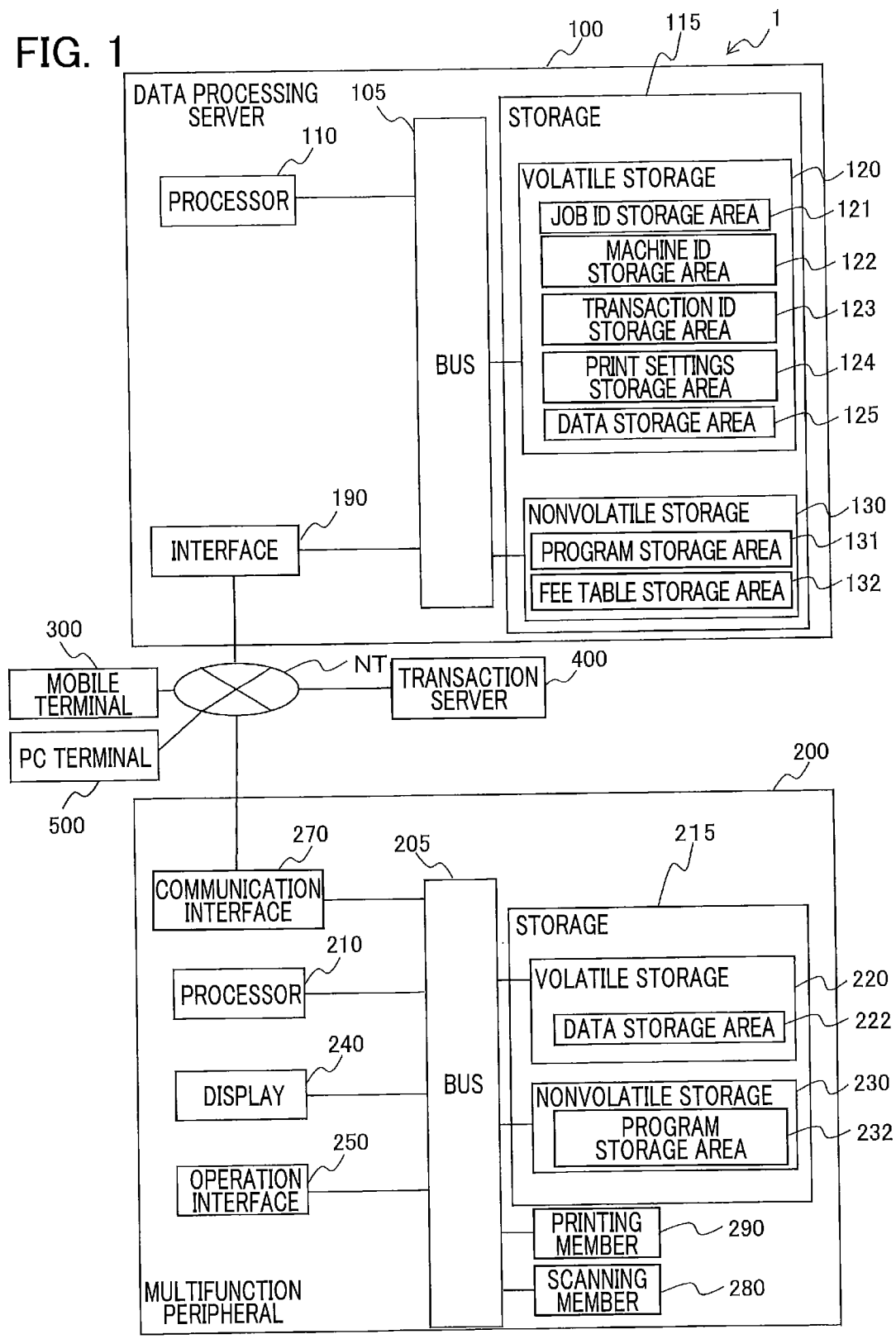
FIG. 1 is a block diagram illustrating an overview of functional structures of a printing system according to an embodiment.

The printing system 1 in FIG. 1 includes a data processing server 100, a multifunction peripheral 200, a mobile terminal 300, a transaction server 400, and a personal computer terminal (PC) 500. The PC is an example of the external device. The data processing server 100, the multifunction peripheral 200, the mobile terminal 300, the transaction server 400, and the PC terminal 500 are interconnected over a network NT and are capable of communicating with each other.

Data Processing Server

The data processing server 100 is installed and managed by the manufacturer of the multifunction peripheral 200, for example. The data processing server 100 has a processor 110, a storage 115, and an interface 190. The processor 110, the storage 115, and the interface 190 are interconnected via a bus 105. The processor 110 is an example of the second controller.

The storage 115 is provided with a volatile storage 120, and a nonvolatile storage 130. The volatile storage 120 is DRAM, for example, and has a job ID storage area 121, a machine ID storage area 122, a transaction ID storage area 123, a print settings storage area 124, and a data storage area 125. The data storage area 125 is an example of the server memory. The nonvolatile storage 130 is a hard disk drive or a solid state drive, for example. The nonvolatile storage 130 has a program storage area 131, and a fee table storage area 132. The details of these storages will be described later in detail.

The processor 110 is a device that performs data processing, such as a CPU. By executing a program stored in the program storage area 131, the processor 110 implements various processes, such as those in FIGS. 2, 7, 10 and the like described later, including processes for performing data communications with the mobile terminal 300, the multifunction peripheral 200, the transaction server 400, and the PC terminal 500 connected to the network NT. The processor 110 is an example of the second controller.

The interface 190 is a wired LAN interface or a wireless interface for communicating with other devices. The interface 190 is connected to the network NT.

Transaction Server

The transaction server 400 is installed at a company providing various online services for settling online payments, for example. Although not shown in the drawings, the transaction server 400 has a processor, a storage, and an interface for connecting to the network NT.

Multifunction Peripheral

The multifunction peripheral 200 is owned by the company providing the print service described above, for example. The multifunction peripheral 200 is an example of the printing device. The multifunction peripheral 200 has a scanning member 280, a printing member 290, a processor 210, a storage 215, a display 240, a user-operable operation interface 250, and a communication interface 270. The scanning member 280, the printing member 290, the processor 210, the storage 215, the display 240, the operation interface 250, and the communication interface 270 are interconnected via a bus 205.

The storage 215 includes a volatile storage 220, and a nonvolatile storage 230. The volatile storage 220 is DRAM, for example. The volatile storage 220 is provided with a data storage area 222 for storing image data. The data storage area 222 is an example of the device memory. The nonvolatile storage 230 is flash memory, for example. The nonvolatile storage 230 is provided with a program storage area 232. Among the various programs stored in the program storage area 232, a printing program of the present embodiment that pertains to the execution of processes in FIGS. 2, 7, 10, and the like described later is prestored in the nonvolatile storage 230 as firmware, for example.

The processor 210 is a device such as a CPU that performs data processing. By executing the printing program stored in the program storage area 232, the processor 210 implements a printing method according to the printing system 1 of the present embodiment in cooperation with the processor 110 of the data processing server 100. Through this execution, the processor 210 can control the printing member 290 to print images based on image data received from the PC 500. The processor 210 is an example of the first controller.

The display 240 is a liquid crystal display, for example. The operation interface 250 is a device that receives user operations. By operating the operation interface 250, the user can input various instructions into the multifunction peripheral 200. The communication interface 270 is a wired or wireless network interface for communicating with other devices. The communication interface 270 is connected to the network NT.

The scanning member 280 optically reads a document or other scanning target using photoelectric conversion elements, such as a CCD or CMOS, and generates image data representing an image of the scanning target.

The printing member 290 has a conveying mechanism (not shown) for picking up and conveying sheets of paper from a sheet-feeding tray and prints images on the conveyed sheets according to a prescribed method. The following specification describes a case in which printing is performed according to the inkjet method. The paper is an example of the print media.

Mobile Terminal

The mobile terminal 300 is a smartphone or other mobile terminal owned by the user in this example. The mobile terminal 300 connects to the network NT through wireless communication, for example. While not shown in the drawings, the mobile terminal 300 has a processor, a storage, and an interface for connecting to the network NT. Another information terminal such as a personal computer or a tablet computer may be used in place of the mobile terminal 300.

PC

The PC 500 is installed in the user's home or office in this example and is connected to the network NT via wired or wireless communication. While not shown in the drawings, the PC 500 has a processor, a storage, and an interface for connecting to the network NT.

Features of the Embodiment

A feature of the present embodiment is the processing performed on the printing system 1 having the above configuration when the multifunction peripheral 200 receives a print job from the PC 500 and subsequently transmits this print job to the data processing server 100. This feature will be described at length below.

Process Flow

Control procedures executed by the processor 210 of the multifunction peripheral 200, the processor 110 of the data processing server 100, the processor of the transaction server 400, the processor of the mobile terminal 300, and the processor of the PC 500 will be described with reference to FIGS. 2, 7, and 10. Note that references to these processors have been omitted in the following description of FIGS. 2, 7, and 10. That is, expressions such as "the processor of the multifunction peripheral 200" and "by the processor of the multifunction peripheral 200" are simply expressed as "the multifunction peripheral 200" and "by the multifunction peripheral 200."

Sending/Receiving a Print Job

Figure 2:
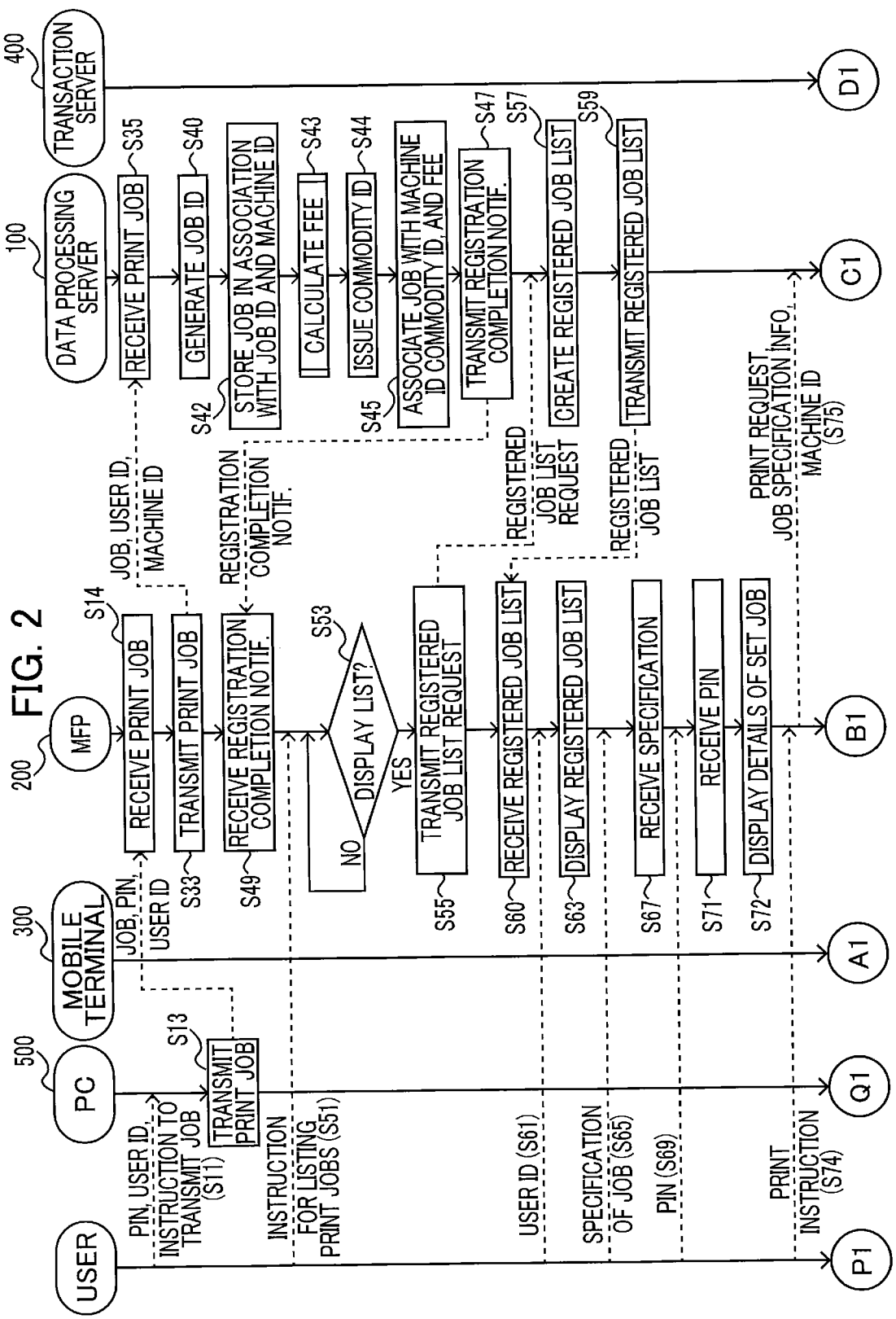
FIG. 2 is a sequence chart illustrating a process executed by a PC, a mobile terminal, a multifunctional peripheral, a data processing server, and a transaction server.

In S11 of FIG. 2, the user first performs operations on an operation interface of the PC 500 for instructing the PC 500 to transmit a print job including image data that the user has prepared for printing. The print job may include a plurality of sets of image data for a plurality of pages. At the same time, the user operates the PC 500 to input a personal user ID, a PIN code, and print settings. The PIN code is for ensuring the security of the print job into the PC 500. These operations can be performed via a printer driver or application installed on the PC 500, for example.

In response, in S13 the PC 500 transmits this print job, the user ID, the PIN code, and the print settings to the multifunction peripheral 200, and in S14 the multifunction peripheral 200 acquires the print job and the like. After acquiring the print job in S14, the multifunction peripheral 200 begins sequentially storing the acquired print job in the data storage area 222. Here, S14 is an example of the print job acquisition step, and the process executed in S14 is an example of the print job acquiring process.

In S33 the multifunction peripheral 200 sends the print job received in S14 to the data processing server 100 together with the machine ID of the multifunction peripheral 200, the user ID, and the print settings received in S14. The user ID is an example of the user identification information, and the machine ID is an example of the device identification information.

The process from the moment the multifunction peripheral 200 receives a print job from the PC 500 in S14 to the moment the multifunction peripheral 200 transmits the print job to the data processing server 100 in S33 is performed relatively quickly. Specifically, after the multifunction peripheral 200 starts storing the acquired print job in the data storage area 222 as described above, the multifunction peripheral 200 begins transmitting the print job to the data processing server 100 before storage of the print job in the data storage area 222 is complete.

As one example of a specific method for this process, each time the multifunction peripheral 200 completes reception of one page worth of image data included in the print job transmitted from the PC 500, the multifunction peripheral 200 may send the image data for this page to the data processing server 100.

Alternatively, the multifunction peripheral 200 may sequentially store image data sequentially acquired from the PC 500 in the data storage area 222 and may begin transmitting image data to the data processing server 100 when the remaining memory space in the data storage area 222 falls below a prescribed value.

Alternatively, the data storage area 222 may be provided with a first area and a second area into which image data can be inputted. With this arrangement, the multifunction peripheral 200 begins by sequentially inputting image data for each page acquired from the PC 500 into the first area of the data storage area 222. Once the remaining memory space in the first area drops below a prescribed value, the multifunction peripheral 200 switches the input destination for image data to the second area. Subsequently, the multifunction peripheral 200 begins inputting image data for each subsequent page into the second area after each page is acquired, while also transmitting the inputted image data for each page directly to the data processing server 100. For example, the multifunction peripheral 200 begins by sequentially inputting image data for each page acquired from the PC 500 into the first area of the data storage area 222. Once the remaining memory space in the first area drops below a prescribed value, the multifunction peripheral 200 switches the input destination for image data to the second area. Subsequently, the multifunction 200 begins inputting image data for each subsequent page into the second area, while also transmitting each image data already stored in the first area to the data processing server 100. Once the transmission of all the image data in the first area to the data processing server 100 is completed and the remaining memory space in the second area drops below the prescribed value, the multifunction peripheral 200 switches the input destination for image data to the first area. Thereafter, the multifunction peripheral 200 begins inputting image data for each subsequent page in the first area while transmitting each image data already stored in the second area to data processing server 100.

Here, S33 is an example of the print job transmission step. Further, the process executed in S33 is an example of the first print job transmitting process and an example of the print job transmitting process.

In S35 the data processing server 100 receives the print job, the user ID, the machine ID, and the print settings that were transmitted from the multifunction peripheral 200 in S33. The process executed in S35 is an example of the first print job receiving process. Subsequently, in S40 the data processing server 100 generates a job ID and in S42 stores the print job received in S35 in the data storage area 125 in association with the job ID generated in S40 and the machine ID received in S35. In S42, the data processing server 100 also stores the print settings in the print settings storage area 124. The process executed in S42 is an example of the print job storing process. The job ID is information for identifying a print job, i.e., information for identifying image data.

In S43 the data processing server 100 calculates the fee to be charged to the user for executing the print job received in S35, i.e., for printing all the image data included in this print job. The process executed in S43 is an example of the fee determining process. To calculate this fee, the data processing server 100 uses a prescribed fee table stored in the fee table storage area 132 of the volatile storage 120, for example. In this calculation, the data processing server 100 also takes into account the values of print settings that were transmitted from the PC 500 together with the print job and stored in the print settings storage area 124 of the data processing server 100.

Subsequently, in S44 the data processing server 100 issues a commodity ID for the service of printing the print job received in S35. Hence, an individual commodity ID is generated for each print job. This commodity ID and the above job ID for the corresponding print job are examples of the job identification information.

Next, in S45 the data processing server 100 associates the above print job with the corresponding machine ID, the commodity ID generated in S44, and the fee calculated in S43 and registers this data. Specifically, the print job, the job ID, and the machine ID are stored in the respective data storage area 125, the job ID storage area 121, and the machine ID storage area 122 in association with the fee and the commodity ID. Note that this print job, the job ID, and the machine ID are also stored in association with the user ID received in S35 at this time.

In S47 the data processing server 100 transmits a registration completion notification to the multifunction peripheral 200 indicating that the registration was completed in S45, and the multifunction peripheral 200 receives this notification in S49.

The process in S11-S49 described above is executed each time a print job is transmitted from the PC 500 in S11. Each time the data processing server 100 receives a print job in S35, the print job is sequentially stored and accumulated in the data storage area 125. Therefore, the number of print jobs stored in the data storage area 125 is not limited to one but may be multiple. In other words, at least one print job is stored in the data storage area 125, each with a corresponding job ID and the machine ID.

After completing the process in S49 described above, in S53 the multifunction peripheral 200 waits (S53: NO) until an instruction to display a registered job list described later has been received. While at least one print job is stored in the data storage area 125, in S51 the user operates the operation interface 250 of the multifunction peripheral 200 appropriately to issue an instruction for listing the print jobs registered on the data processing server 100. As a result, the multifunction peripheral 200 receives this display instruction (S53: YES) and in S55 transmits a request for a registered job list to the data processing server 100.

In response to receiving the request for the registered job list, in S57 the data processing server 100 creates a registered job list listing at least one registered print job that was stored in the data storage area 125 as described above, based on the machine ID for the MFP that issued the request. The registered job list may include additional information on the user ID associated with each print job therein. Note that the multifunction peripheral 200 transmits its machine ID together with the request for the registered job list in S55. Accordingly, when creating the registered job list in S57, the data processing server 100 may be configured to include only print jobs that correspond to the machine ID transmitted from the multifunction peripheral 200 from among all print jobs that were stored in association with machine IDs.

In S59 the data processing server 100 transmits the registered job list created in S57 to the multifunction peripheral 200, and the multifunction peripheral 200 receives this list in S60. Here, the registered job list is an example of the job list, and the process executed in S57 and S59 is an example of the list transmitting process.

Figure 3:
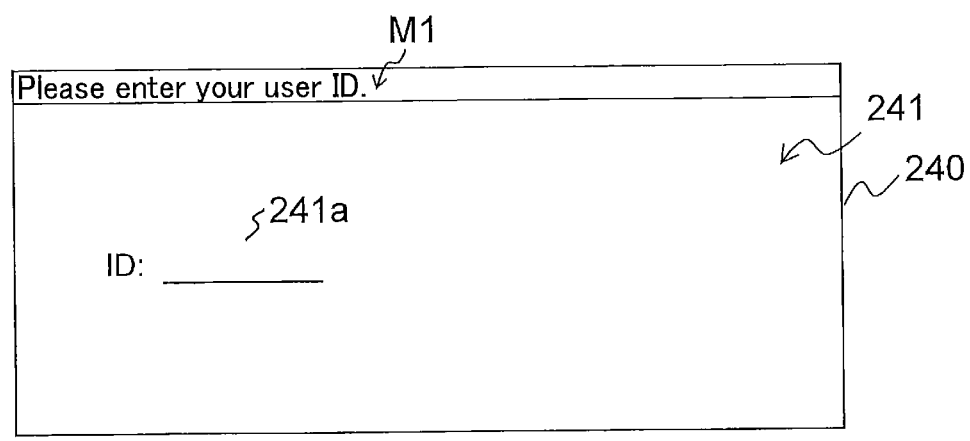
FIG. 3 is an explanatory diagram illustrating a user ID entry screen displayed on a display of the multifunction peripheral.

In response to the registered job list received in S60 after the multifunction peripheral 200 received the instruction to display the list of print jobs described above, the multifunction peripheral 200 displays a user ID entry screen 241 shown in FIG. 3 on the display 240. The user ID entry screen 241 includes a message M1, and a user ID field 241a. The message M1 is "Please enter your user ID." While the user ID entry screen 241 is displayed on the display 240, in S61 the user performs appropriate operations on the operation interface 250 to input the user's own user ID in the user ID field 241a, and the multifunction peripheral 200 receives these operations. This process of receiving operations is an example of the user identification information receiving process.

In S63 the multifunction peripheral 200 displays the registered job list on the display 240. Here, the displayed registered job list includes only those print jobs registered on the data processing server 100 that correspond to the user ID. The process executed in S63 is an example of the print job displaying process. Hereinafter, the expression "the user inputs data in the entry field displayed on the display 240 through operations on the operation interface 250" will simply be referred to as "the user inputs data into the entry field of the display 240" or the like as appropriate. Similarly, the expression "the user performs an operation or selection or specification or the like of a button or key in a display or the like displayed on the display 240 via the operation interface 250" will simply be referred to as "the user operates or presses a button or key on the display 240" or "the user selects or specifies content corresponding to a displayed name".

Note that when the multifunction peripheral 200 receives a registered job list from the data processing server 100 in S60 that pertains to all users of the multifunction peripheral 200, the multifunction peripheral 200 may extract and display only those jobs in the list that correspond to the user ID inputted in S61. Alternatively, the data processing server 100 may send a registered job list to the multifunction peripheral 200 that corresponds to this user ID. Further, when security of the registered job list is not an issue, the process of S61 for entering a user ID in S61 may be omitted, and in S63 the multifunction peripheral 200 may display the registered job list received in S60 for all users on the display 240.

Further, rather than receiving a registered job list from the data processing server 100, the multifunction peripheral 200 may store the name or the like of each print job received in S14 and may sequentially create a list of the print jobs. In this case, the list of print jobs may be a list of job IDs or the like and is not limited to the names of the print jobs.

Figure 4:
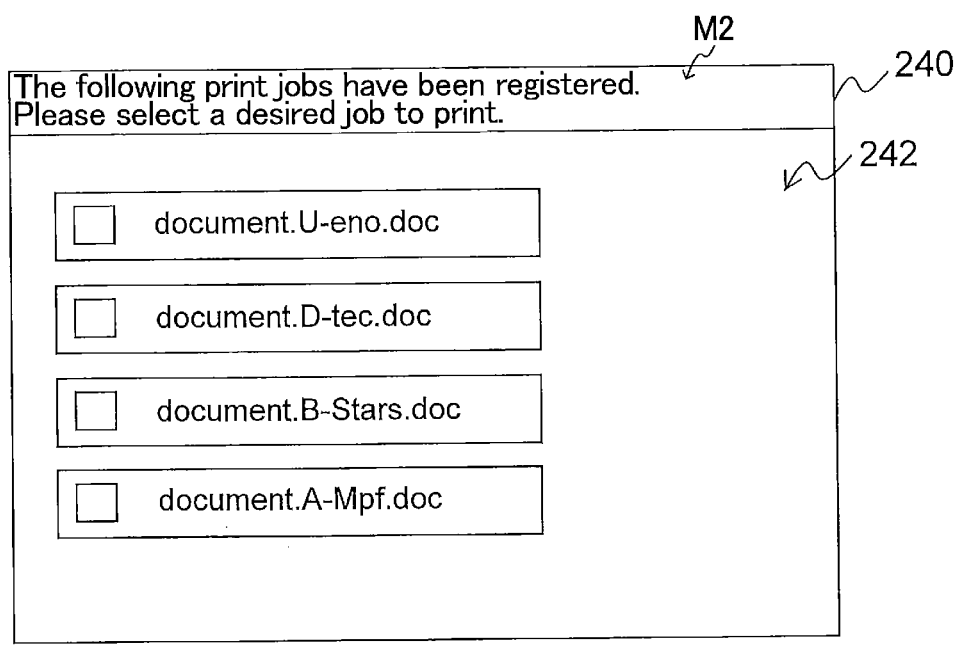
FIG. 4 is an explanatory diagram illustrating a registered job list display screen displayed on the display of the multifunction peripheral.

FIG. 4 shows an example of a registered job list displayed on the display 240, as described above. In FIG. 4, a registered job list display screen 242 is displayed on the display 240. The registered job list display screen 242 includes a message M2, and identification information for each print job associated with the user ID. In this example, the message M2 is "The following print jobs have been registered. Please select a desired job to print." Further, the identification information in this example is a list of filenames for the print jobs. The identification information for print jobs is an example of the print job related information. In the example of FIG. 4, four print jobs having the filenames "document.U-eno.doc", "document.D-tec.doc", "document.B-stars.doc", and "document.A-Mpf doc" are displayed as selectable candidates for printing. The registered job list may be generated to include the fees for the print jobs and these fees may be displayed in the job list display screen 242.

While the registered job list display screen 242 is displayed on the display 240, in S65 the user specifies (designates) a desired print job by entering a checkmark in the checkbox next to the filename of the job, and in S67 the multifunction peripheral 200 receives this specification (or designation). Although the user can specify only one print job in S65 in this embodiment, the user may be allowed to specify (designate) more than one print job instead. As an alternative, the process in S53-S63 may be omitted when the user knows the job name or job ID identifying the print job and can specify this print job according to another method without viewing the job ID or the like displayed in a list. S67 is an example of the specification reception step, and the process executed in S67 is an example of the specification receiving process.

Figure 5:
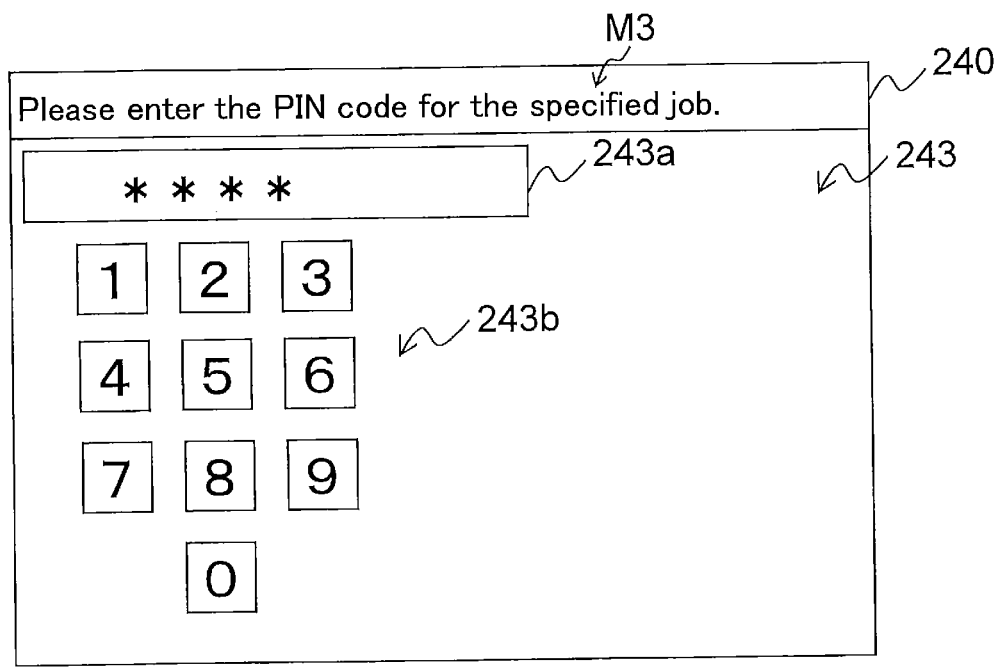
FIG. 5 is an explanatory diagram illustrating a PIN code entry screen displayed on the display of the multifunction peripheral.

When the user specifies one of the print jobs described above, the multifunction peripheral 200 displays a PIN code entry screen 243 shown in FIG. 5 on the display 240. The PIN code entry screen 243 includes a message M3, a PIN code field 243a, and a numeric keypad 243b. The message M3 is "Please enter the PIN code for the specified job." In S69 the user operates the numeric keypad 243b to input the PIN code for the specified job into the PIN code field 243a of the PIN code entry screen 243, and specifically to re-input the PIN code that was originally inputted in S11 when the print job specified in S65 was transmitted to the multifunction peripheral 200. In S71 the multifunction peripheral 200 receives the inputted PIN code and in S72 sets (decides) this print job as the specified print job and displays details of the file information for the specified print job on the display 240.

Figure 6:
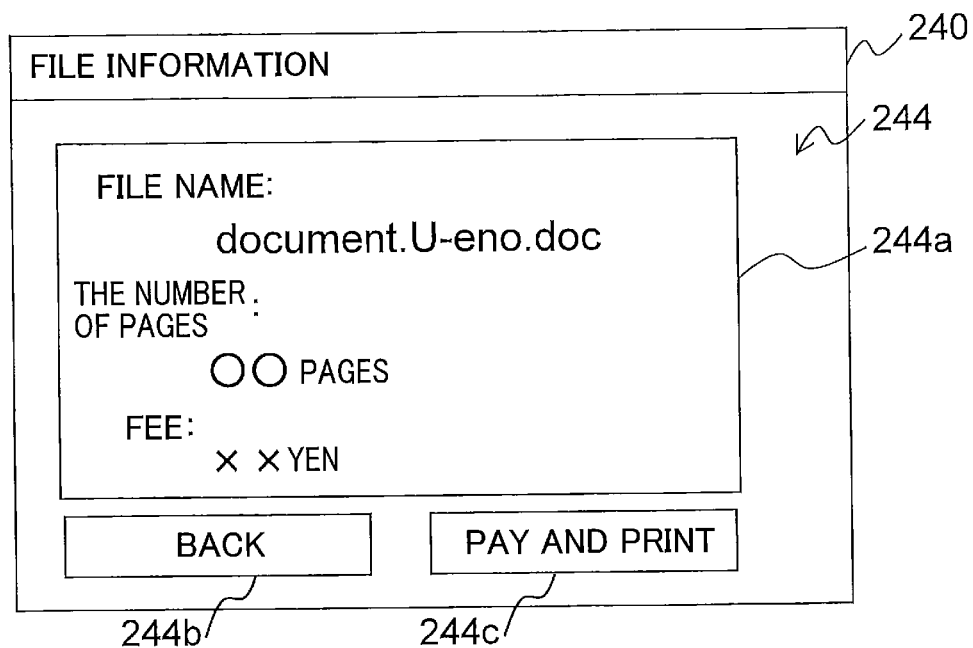
FIG. 6 is an explanatory diagram illustrating a file information display screen displayed on the display of the multifunction peripheral.

FIG. 6 shows an example of file information for a print job that is displayed on the display 240, as described above. As shown in FIG. 6, a file information display screen 244 is displayed on the display 240. This example shows the case in which the print job having the filename "document.Ueno.doc" was specified. As shown in FIG. 6, the file information display screen 244 includes a file information field 244a, a "Back" button 244b, and a "Pay and Print" button 244c.

The file information displayed in the file information field 244a of this example includes the filename "document.Ueno.doc", the number of pages in the file for the print job, and the fee charged for executing the print job. The fee displayed in the file information field 244a may be based on information for the fee amount calculated by the data processing server 100 in S43. In such a case, this information for the fee amount may be included in the print job, and the data processing server 100 may transmit to the multifunction peripheral 200 this print job with the information for the fee amount. Alternatively, the processor 210 of the multifunction peripheral 200 may independently calculate the fee amount. When the processor 210 calculates the fee, the processor 210 may use the same method described in S43 for the print job whose specification was received in S67. In this case, the calculation process executed by the processor 210 is an example of the fee determining process.

Alternatively, the fee for each print job may be included in the registered job list and displayed in the job list display screen 242 shown in FIG. 4 along with the filename of the corresponding print job.

In S74 the user operates the "Pay and Print" button 244c in the file information display screen 244 to issue a final print instruction to the multifunction peripheral 200. The operation of the "Pay and Print" button 244c is an example of the prescribed print instruction operation. In response to this operation, in S75 the multifunction peripheral 200 transmits a print request corresponding to this print instruction to the data processing server 100 together with specification information indicating the specified print job such as the job ID and the machine ID for the multifunction peripheral 200, and the data processing server 100 receives this information. The transmission procedure performed by the multifunction peripheral 200 in S75 is an example of the print request transmission step, and the process for performing this transmission is an example of the print request transmitting process. Further, the receiving process by which the data processing server 100 receives this request is an example of the print request receiving process.

In place of the payment calculation in S43 described above, the multifunction peripheral 200, having received a print instruction in S74, may calculate the fee required to execute the print job whose selection was received in S67 using the same method described in S43. In this case, the multifunction peripheral 200 may transmit the calculated fee to the data processing server 100. In this case, the calculation process performed at this time is an example of the fee determining process.

Figure 7:
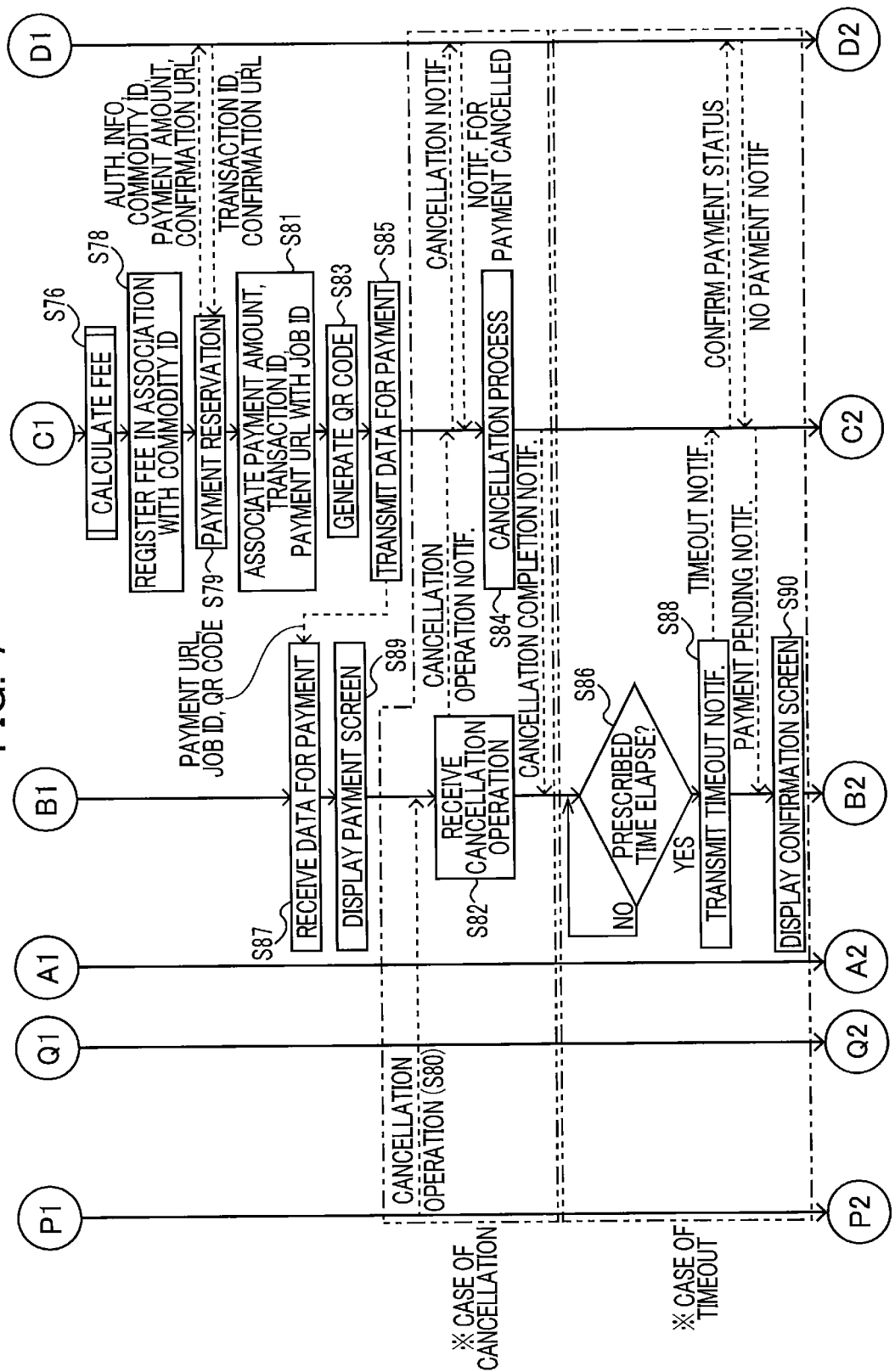
FIG. 7 is a sequence chart illustrating a process executed by the PC, the mobile terminal, the multifunctional peripheral, the data processing server, and the transaction server continued from the sequence chart of FIG. 2.

Continuing in FIG. 7, in response to the print request received in S75, in S76 the data processing server 100 recalculates the fee amount to be charged to the user for printing the specified print job, i.e., the fee for the current printing service based on the print job specification received in S75. As in S43 described above, the data processing server 100 calculates the fee based on a prescribed fee table, for example. At this time, the data processing server 100 may provide some benefit to the user, such as a discount on the above fee amount, the issuance of a discount ticket or coupon that can be used separately from this transaction, a separate granting of points or miles, or some other preferential right according to the type of the specified print job, the number of pages included in the print job, and the like. S76 is another example of the fee determination step, and the process executed in S76 is an example of the fee determining process.

Subsequently in S78 the data processing server 100 registers the fee calculated in S76 in association with the commodity ID issued in S44 for the specified print job. Note that the job ID described above may be used in place of the commodity ID. When the multifunction peripheral 200 calculates the fee after the print instruction is received in S74 and transmits the calculated fee to the data processing server 100, the data processing server 100 may register the fee received from the multifunction peripheral 200 with the commodity ID. In this case, the process of S76 may be omitted.

In S79 the data processing server 100 performs a payment reservation process. Specifically, the data processing server 100 transmits the commodity ID associated with the specified print job, the payment amount for the user resulting from the calculation in S76, authentication information used for authentication on the transaction server 400, and a confirmation URL for confirming when payment is complete (a URL for the data processing server 100 in the present embodiment) to the transaction server 400. The process for performing this transmission is an example of the fee transmitting process.

As a result of this transmission, the data processing server 100 receives a payment URL that the user can access to pay the fee, and a transaction ID related to this fee payment procedure from the transaction server 400.

Next, in S81 the data processing server 100 associates the payment amount resulting from the calculation in S76 and the transaction ID and payment URL acquired in S79 with the job ID described above. In S83 the data processing server 100 generates a barcode, such as a QR code, corresponding to the payment URL according to a suitable method known in the art, and in S85 transmits data required for making a payment, including the QR code, the job ID, and the payment URL, to the multifunction peripheral 200 having the machine ID received in S75. "QR code" is a registered Japanese trademark of DENSO WAVE INCORPORATED. The data required for making the payment is an example of the payment procedure information, and the process executing S85 is an example of the payment information transmission process.

In S87 the multifunction peripheral 200 receives this data required for payment, which includes the payment URL and job ID in addition to a QR code (registered trademark). The process executed in S87 is an example of the payment information receiving process. After receiving this data, in S89 the multifunction peripheral 200 displays a prescribed payment screen on the display 240 showing information including at least this QR code based on the data required for payment. The process executed in S89 is an example of the payment information displaying process.

Figure 8:
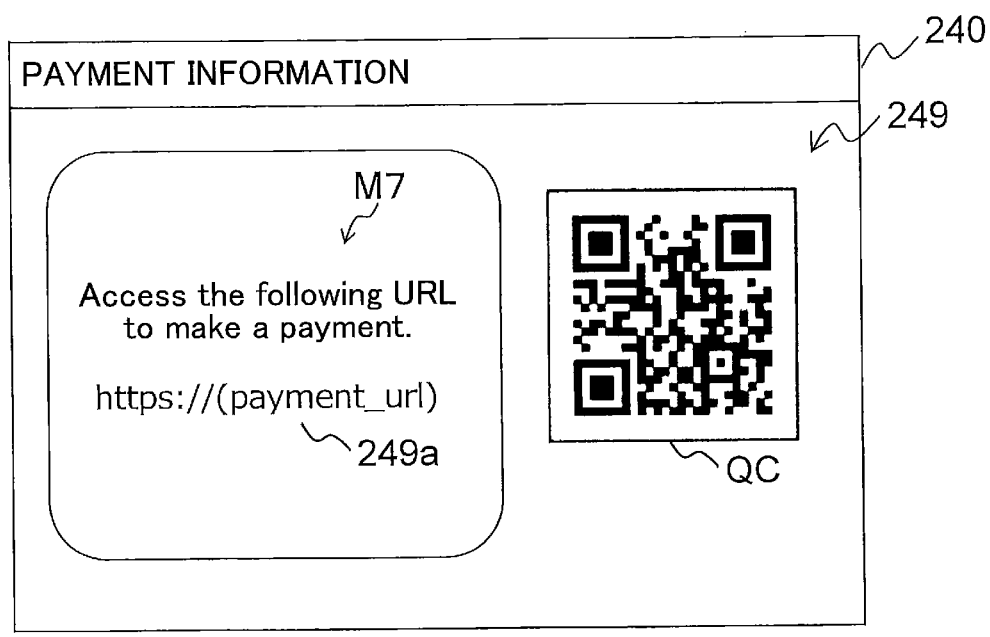
FIG. 8 is an explanatory diagram illustrating a payment screen displayed on the display of the multifunction peripheral.

FIG. 8 shows an example of a payment screen 249. The payment screen 249 shown in FIG. 8 includes a QR code QC, a message M7, and a URL field 249a displaying a URL that the user can access to pay the fee. The message M7 is "Access the following URL to make a payment." Note that rather than outputting the data required for payment to be displayed, the multifunction peripheral 200 may output the data to be printed by the printing member 290. In other words, images of the data may be formed on paper.

In a case that the user has a change of mind after viewing the payment screen 249 displayed as described above, in S80 the user may perform a prescribed cancellation operation on the operation interface 250 in order to cancel the printing service. In S82 this operation is received by the multifunction peripheral 200, and the multifunction peripheral 200 transmits a notification of the cancellation operation to the data processing server 100. Upon receiving this notification, the data processing server 100 also transmits a cancellation notification to the transaction server 400 and subsequently receives a notification from the transaction server 400 indicating that the current payment prepared in S79 has been canceled. Upon receiving this notification from the transaction server 400, in S84 the data processing server 100 executes a prescribed cancellation process and, after completing the cancellation process, transmits a cancellation completion notification to the multifunction peripheral 200. As a result, the multifunction peripheral 200 displays a message on the display 240 indicating that the job has been canceled.

On the other hand, in a case that the user has not performed a cancellation operation, in S86 the multifunction peripheral 200 continually determines whether a prescribed time has elapsed (S86: NO). When the prescribed time elapses without the user performing any operations in the payment screen 249 displayed as described above (S86: YES), in S88 the multifunction peripheral 200 transmits a timeout notification to the data processing server 100. Upon receiving a timeout notification from the multifunction peripheral 200, the data processing server 100 issues a request to the transaction server 400 to confirm the payment status for the corresponding print job. When the data processing server 100 receives a notification from the transaction server 400 indicating that no payment has been made for the fee prepared in S79, the data processing server 100 transmits a corresponding payment pending notification to the multifunction peripheral 200. In response to receiving this payment pending notification, in S90 the multifunction peripheral 200 displays a payment pending confirmation screen on the display 240.

Figure 9:
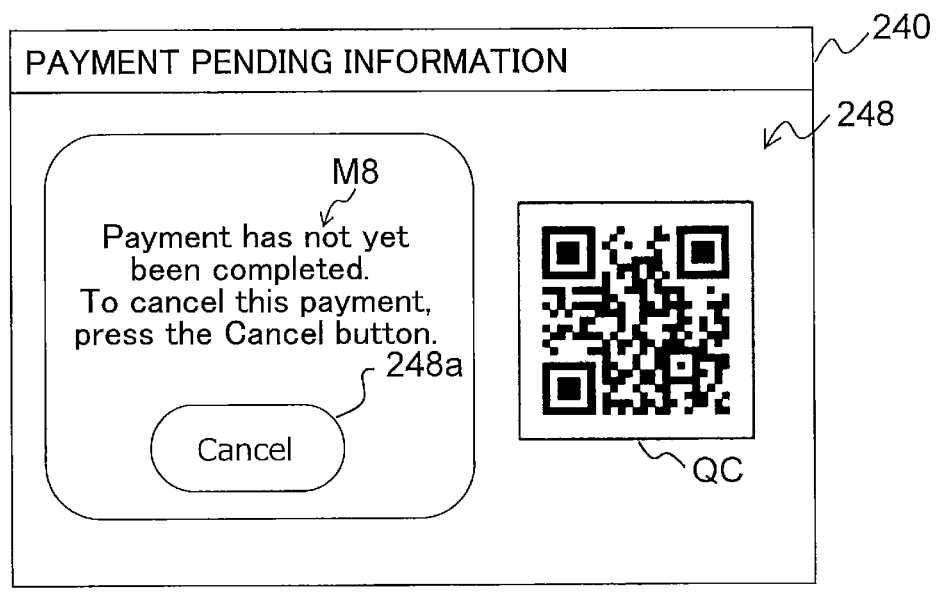
FIG. 9 is an explanatory diagram illustrating a payment pending confirmation screen displayed on the display of the multifunction peripheral.

FIG. 9 shows an example of a payment pending confirmation screen 248. The payment pending confirmation screen 248 shown in FIG. 9 includes the QR code QC, a message M8, and a "Cancel" button 248a. The message M8 is "Payment has not yet been completed. To cancel this payment, press the Cancel button." When the user operates the "Cancel" button 248a in this case, the process described above is performed from S82 and a cancellation complete notification is transmitted to the multifunction peripheral 200.

On the other hand, in a case that the user does not perform a cancellation operation as described above, in S91 of FIG. 10 scans the QR code QC displayed in the payment screen 249 (FIG. 8) with a scanner or camera provided in the mobile terminal 300 before the prescribed time has elapsed, or scans the QR code QC displayed in the payment pending confirmation screen 248 (FIG. 9) after the prescribed time has elapsed. In response, the mobile terminal 300 displays a payment URL screen (not shown) that includes a payment URL. By accessing the payment URL displayed in the payment URL screen, the user can display a fee display screen that includes the above calculated fee and the like and can learn the amount that the user must pay to use the current printing service.

After viewing the fee, the user then performs appropriate operations in the fee display screen displayed on the mobile terminal 300. As a result of these operations, in S105 the mobile terminal 300 transmits a payment approval notification to the transaction server 400. The payment approval notification indicates that the user has approved of the above payment process, i.e., has agreed to pay the aforementioned fee.

After receiving the approval notification, in S107 the transaction server 400 transmits the confirmation URL to the mobile terminal 300 that corresponds to the payment URL sent to the data processing server 100 in S79 during the payment reservation. Based on this confirmation URL, in S109 the mobile terminal 300 transmits a payment completion request to the data processing server 100, and the data processing server 100 receives this request. In the meantime, the data processing server 100 repeatedly performs the determination in S111 while a payment completion request has not been received (S111: NO). When the data processing server 100 determines that a payment completion request was received (S111: YES), in S113 the data processing server 100 performs a process to confirm payment completion. Specifically, the data processing server 100 transmits the authentication information, commodity ID, and transaction ID corresponding to the confirmation URL to the transaction server 400. Subsequently, the data processing server 100 receives a return code from the transaction server 400 in response.

After performing the process to confirm payment completion, in S115 the data processing server 100 transmits a payment completion notification, which the mobile terminal 300 receives in S117. The process executed in S115 is an example of the second print job transmitting process. S117 is an example of the print job reception step, and the process executed in S117 is an example of the print job receiving process. Furthermore, in S125 the data processing server 100 transmits the print job received in S35 that was specified in the job specification information received in S75 and whose fee was paid as described above together with the job ID and the print settings, and in S126 the multifunction peripheral 200 receives this print job and the print settings. Thereafter, in S127 the multifunction peripheral 200 controls the printing member 290 to begin printing the print job received in S126 based on the print settings.

Note that the present disclosure is not limited to the data processing server 100 transmitting a print job to the multifunction peripheral 200 in S125 and S126 described above and the multifunction peripheral 200 printing the print job in S127. That is, the multifunction peripheral 200 may sequentially save and maintain print jobs received in S14 described above together with the print settings and may print a print job in S127 that was specified in S65 and saved therein. S127 is an example of the printing step, and the process executed in S127 is an example of the printing process.

The multifunction peripheral 200 continues printing a print job while printing is not complete (S277: NO). Once the print job has been completed (S277: YES), in S279 the multifunction peripheral 200 transmits a print completion notification to the data processing server 100 together with the job ID. The process executed in S279 is an example of the job identification information transmitting process. In S281 the data processing server 100 receives the print completion notification and job ID from the multifunction peripheral 200 and in S283 deletes the print job corresponding to the received job ID from the data storage area 125. The process executed in S283 is an example of the print job deleting process. This ends the process performed on the printing system 1.

Effects of the Embodiment

As described above, the printing system 1 of the present embodiment is provided with the multifunction peripheral 200 and the data processing server 100.

When the PC 500 transmits the print job, the multifunction peripheral 200 acquires this print job in S14 and sends the print job to the data processing server 100 in S33. The data processing server 100 acquires this print job in S35 and stores the print job in the data storage area 125 in S42.

When the user subsequently specifies the desired print job via the operation interface 250, the multifunction peripheral 200 receives this specification in S67 and later in S75 transmits the request to the data processing server 100 to print the print job corresponding to this specification. When the user agrees to the charges generated in response to this print request, in S105 the mobile terminal 300 transmits the notification to the transaction server 400 approving the payment of these charges.

Accordingly, in S125 the data processing server 100 identifies the print job stored in the data storage area 125 that is related to the print request and transmits this print job to the multifunction peripheral 200. After receiving this print job in S126, in S127 the multifunction peripheral 200 controls the printing member 290 to print the job.

As described above, a feature of the present embodiment is that after the multifunction peripheral 200 acquires the print job from the PC 500, the multifunction peripheral 200 transfers this print job to the data processing server 100 to be stored before the user designates the print job for printing. Payment for the print job is settled when the user specifies the print job under these conditions. Thus, even when the multifunction peripheral 200 is not provided with a large-capacity memory, print jobs from the PC 500 can be sent to the data processing server 100 so that printing can be performed after payment is settled.

Another feature of the present embodiment is that after the multifunction peripheral 200 acquires the print job in S14, the multifunction peripheral 200 first begins storing the print job in the data storage area 222 and then begins transmitting the print job to the data processing server 100 in S33 before storage in the data storage area 222 is complete. This approach enables the multifunction peripheral 200 to implement the method of the present disclosure reliably despite the data storage area 222 having a small capacity.

Another feature of the present embodiment is that the data processing server 100 can determine the fee to be charged for the print job received from the multifunction peripheral 200, as described above. After determining the fee, the data processing server 100 associates this fee with the job ID of the print job in order to define their relationship clearly and facilitate subsequent processing. Further, setting the fee in S43 upon receiving the print job effectively enables the printing system 1 to proceed immediately to the payment process when the multifunction peripheral 200 executes S75.

Another feature of the present embodiment is that the print job and the job ID are stored in the data storage area 125 in an associated state. This facilitates the data processing server 100 in reading a desired print job from the data storage area 125 using a job ID when the image data storage area 125 stores a plurality of print jobs.

Another feature of the present embodiment is that when the data processing server 100 receives the print request from the multifunction peripheral 200 in S75, later in S79 the data processing server 100 transmits a fee for executing the print job to the transaction server 400 together with the commodity ID related to the print job. After the payment of this fee is processed on the transaction server 400, in S125 the data processing server 100 reads the print job associated with the commodity ID from the data storage area 125 and transmits this print job to the multifunction peripheral 200. In this way, the commodity ID can be used to facilitate the settlement of charges for the print job and transmission of the print job to the multifunction peripheral 200 after the print request has been received from the multifunction peripheral 200.

Another feature of the present embodiment is that the multifunction peripheral 200 transmits the job ID for the print job completed in S127 to the data processing server 100 in S279, and the data processing server 100 deletes the print job corresponding to this job ID in S283. By deleting the print job after the job has been printed, the data processing server 100 can ensure the security of the print job.

Another feature of the present embodiment is that in S63 the multifunction peripheral 200 displays the identification information on the display 240 for at least one print job. Displayed print jobs are candidates for printing that the user can select when specifying a job to be printed. When the user specifies one of the displayed print jobs, in S67 the multifunction peripheral 200 receives this specification. This process facilitates the user in specifying and printing a desired print job from among the print jobs stored in the data storage area 125 of the data processing server 100.

Another feature of the present embodiment is that when displaying identification information for at least one print job among the printing candidates in the registered job list, in S63 the multifunction peripheral 200 can also display the charges for those print jobs. This facilitates the user in understanding the fees required for executing print jobs.

Another feature of the present embodiment is that in S57 the data processing server 100 generates a registered job list that includes at least one print job and in S59 transmits the registered job list to the multifunction peripheral 200, whereby in S63 the multifunction peripheral 200 displays the registered job list on the display 240. Thus, by creating the registered job list on the data processing server 100, which is provided with the data storage area 125 for storing a plurality of print jobs, and transmitting this registered job list to the multifunction peripheral 200, the user can be presented with print jobs that are possible printing candidates and can be prompted to specify a desired print job. For this reason, print jobs are stored in the data storage area 125 in S42 of the present embodiment in association with the machine ID. Accordingly, when the data processing server 100 transmits the aforementioned registered job list, the data processing server 100 can easily create the registered job list by simply reading only those print jobs from the data storage area 125 that correspond to the machine ID of the multifunction peripheral 200.

Another feature of the present embodiment is that in S61 the user inputs the user ID via the operation interface 250 when specifying a desired print job. After receiving this inputted user ID, in S67 the multifunction peripheral 200 accepts only specifications for print jobs corresponding to that user ID. Since the user from whom the multifunction peripheral 200 originally acquired the print job is compared with the user who later specifies the print job, security and smooth processing can be ensured.

Another feature of the present embodiment is that the multifunction peripheral 200 also acquires the PIN code from the PC 500 when receiving the print job in S14. When the user subsequently specifies a desired print job via the operation interface 250 in S65 and further inputs the PIN code in S69, the multifunction peripheral 200 transmits the print request for the specified print job to the data processing server 100 in S75. In this way, since the multifunction peripheral 200 compares the PIN code received when the print job was initially acquired from the PC 500 with the PIN code subsequently inputted when the print job is specified for printing, ensure security and smooth processing can be improved.

Another feature of the present embodiment is that when the user specifies the print job in S65, inputs the PIN code in S69, and issues the print instruction in S74 via the operation interface 250, in S75 the multifunction peripheral 200 transmits the print request and the machine ID of the multifunction peripheral 200 to the data processing server 100. Use of this machine ID ensures that the data processing server 100 can reliably send the multifunction peripheral 200 the various information needed for approving the payment of charges for the print job being printed.

Another feature of the present embodiment is that in S85 the data processing server 100 transmits data required for the approval of payment to the multifunction peripheral 200 identified by the machine ID that was received in S75, as described above. After receiving this data in S87, in S89 the multifunction peripheral 200 displays the received data on the display 240. Transmitting data required for payment to the corresponding multifunction peripheral 200 to be displayed on the display 240 of the same ensures that the user's approval of payment can proceed smoothly and securely.

Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The above examples describe cases of performing a "calculation" to determine the fee for printing, but the present disclosure is not limited to this method of determining the fee. That is, the fee table described above may include ranges for various parameters such as numbers of pages in the print job and coverages and may individually associate a fee amount with each of the ranges. In this case, the table may be referenced to determine a fee without complicated calculation.

Using the number of pages to be printed as an example, the table may record XX1 yen for a range of pages from A pages to B pages, XX2 yen for a range of pages from B pages to C pages, etc. Thus, once the number of pages is acquired from the print job, the fee can be determined directly by referencing the table without performing the complicated calculation.

In the embodiment, the multifunction peripheral 200 performs printing in the inkjet method. However, the method of printing is not limited thereto. For example, the multifunction peripheral may perform printing in one of other known methods, such as, the laser method or the thermal transferring method. In such a case, the same effects can be obtained.

The sequence charts of FIGS. 2, 7, and 10 are examples but not limit the present disclosure, and thus one or more steps or processes may be added deleted, and/or processing order may be modified without modifying the scope or concept of the present invention.

In addition to what has already been described, the methods according to the embodiment and its variations described above may be used in suitable combinations.

In addition, although not illustrated individually, the present disclosure may be implemented with various modifications without departing from the spirit of the disclosure.

What is claimed is:
1. A printing system comprising:
    a printing device comprising:
        a printing member configured to perform printing on a print medium;
        an operation interface; and
        a first controller; and
    a data processing server comprising:
        a server memory; and
        a second controller,
    wherein the first controller is configured to perform:
        a print job acquisition process to acquire a print job from an external device; and
        a first print job transmitting process to transmit the print job to the data processing server in response to acquiring the print job,
    wherein the second controller is configured to perform:
        a first print job receiving process to receive the print job which is transmitted in the first print job transmitting process; and
        a print job storing process to store the print job received in the first print job receiving process in the server memory,
    wherein the first controller is configured to further perform:
        a designation receiving process to receive designation of the print job subject to printing via the operation interface; and a print request transmitting process to transmit a print request for printing the print job subject to printing designated in the designation receiving process to the data processing server, wherein the second controller is configured to further perform:

a second print job transmitting process, after a fee payment approval to approve a payment for execution of the designated print job is transmitted, to transmit to the printing device the print job which is designated in the designation receiving process and stored in the server memory, wherein the first controller is configured to further perform:

a second print job receiving process to receive the print job which is transmitted in the second print job transmitting process; and a print process to perform printing the print job, which is received in the second print job receiving process, on a print medium by controlling the printing member.

2. The printing system according to claim 1, wherein the printing device further comprises a device memory, wherein the first controller is configured to further perform:

starting storing the acquired print job in the device memory, wherein in the first print job transmitting process, the first controller starts transmitting the print job to the data processing server before storing the acquired print job in the device memory is completed.

3. The printing system according to claim 2, wherein the second controller is configured to further perform:

a fee determining process to determine a fee to be charged for execution of the print job received in the first print job receiving process; and associating job identification information identifying the print job received in the first print job receiving process with the fee determined in the fee determining process.

4. The printing system according to claim 3, wherein in the print job storing process, the second controller stores the print job so that the stored print job is associated with the job identification information.

5. The printing system according to claim 3, wherein the second controller is configured to further perform:

a print request receiving process to receive the print request transmitted in the print request transmitting process; and a fee transmitting process, in response to reception of the print request, to transmit information on the determined fee and the job identification information corresponding to the fee to a transaction server, wherein in the second print job transmitting process, after the payment of the fee corresponding to the job identification information is settled in the transaction server, the second controller transmits to the printing device the print job which is designated in the designation receiving process and stored in the server memory.

6. The printing system according to claim 3, wherein the first controller is configured to further perform:

a job identification information transmitting process to transmit to the data processing server the job identification information identifying the print job for which printing is completed in the print process, wherein the second controller is configured to further perform:

a print job deleting process to delete from the server memory the print job which is identified by the job identification information transmitted in the job identification information transmitting process.

7. The printing system according to claim 3, wherein the printing device further comprises a display, wherein the first controller is configured to further perform:

a print job display process to display information on one or more print jobs as candidates for printing on the display, the one or more print jobs including the print job stored in the server memory in the print job storing process, wherein in the designation receiving process, the first controller receives the designation of the print job among the one or more print jobs included in the displayed information.

8. The printing system according to claim 7, wherein in the print job display process, the first controller displays the information on the one or more print jobs and one or more fees each corresponding to one of the one or more print jobs.

9. The printing system according to claim 7, wherein in the print job storing process, the second controller stores in the server memory the print job so that the print job is associated with device identification information identifying the printing device from which the print job is received, wherein the second controller is configured to further perform:

a list transmitting process to generate a job list including the one or more print jobs as candidates for printing and transmit the job list to the printing device, wherein in the print job display process, the first controller displays the job list transmitted in the list transmitting process.

10. The printing system according to claim 1, wherein the first controller is configured to further perform:

a user identification information receiving process to receive input of user identification information inputted via the operation interface, wherein in the designation receiving process the first controller receives the designation of the print job corresponding to the user identification information received in the user identification information receiving process.

11. The printing system according to claim 1, wherein in the print job acquisition process, the first controller receives the print job and a PIN code corresponding to the print job, wherein the first controller is configured to further perform:

a PIN code receiving process to receive again the PIN code via the operation interface after the print job acquisition process is performed, wherein in the print request transmitting process, the first controller transmits the print request to the data processing server after the print job is designated and the PIN code is received in the PIN code receiving process via the operation interface.

12. The printing system according to claim 11, wherein in the print request transmitting process, the first controller transmits device identification information identifying the printing device together with the print request in response to reception of the designation of the print job, reception of the PIN code in the PIN code receiving process, and reception of a prescribed print instruction operation via the operation interface.

13. The printing system according to claim 12, wherein the second controller is configured to further perform:
   a fee information transmitting process to transmit fee information required to approve settlement of a fee for executing the designated print job to the printing device identified by the device identification information transmitted in the print request transmitting process,
   wherein the first controller is configured to further perform:
   a fee information receiving process to receive the fee information transmitted in the fee information transmitting process; and
   a fee information display process to display on the display the fee information received in the fee information receiving process.

14. A printing device comprising:
   a printing member configured to perform printing on a print medium;
   an operation interface; and
   a controller configured to perform:
   a print job acquisition process to acquire a print job from an external device;
   a print job transmitting process to transmit the print job to a data processing server in response to acquiring the print job;
   a designation receiving process to receive designation of the print job subject to printing via the operation interface;
   a print request transmitting process to transmit a print request for printing the print job subject to printing designated in the designation receiving process to the data processing server;
   a print job receiving process, after a fee payment approval to approve a payment for execution of the designated print job is transmitted, to receive the print job which is transmitted from the data processing server; and
   a print process to perform printing the print job, which is received in the print job receiving process, on a print medium by controlling the printing member.

15. A non-transitory computer readable storage medium storing a set of program instructions executed by a computer in a printing device, the printing device including a printing member configured to perform printing on a print medium, and an operation interface, the set of program instructions comprising:
   acquiring a print job from an external device;
   transmitting the print job to a data processing server in response to acquiring the print job;
   receiving designation of the print job subject to printing via the operation interface; and
   transmitting a print request for printing the print job subject to printing designated in the receiving designation;
   receiving, after a fee payment approval to approve a payment for execution of the designated print job is transmitted, the print job which is transmitted from the data processing server; and
   printing the print job, which is received in the receiving the print job, on a print medium by controlling the printing member.

16. A printing system comprising:
   a printing device comprising:
   a printing member configured to perform printing on a print medium;
   an operation interface; and
   a first controller; and
   a data processing server comprising:
   a server memory; and
   a second controller,
   wherein the first controller is configured to perform:
   a print job acquisition process to acquire a print job from an external device; and
   a first print job transmitting process to transmit the print job to the data processing server in response to acquiring the print job,
   wherein the second controller is configured to perform:
   a first print job receiving process to receive the print job which is transmitted in the first print job transmitting process; and
   a print job storing process to store the print job received in the first print job receiving process in the server memory,
   wherein the first controller is configured to further perform:
   a designation receiving process to receive designation of the print job subject to printing via the operation interface; and
   a print request transmitting process to transmit a print request for printing the print job subject to printing designated in the designation receiving process to the data processing server,
   wherein the second controller is configured to further perform:
   confirming that payment for execution of the designated print job is completed;
   a second print job transmitting process, after the confirming is completed, to transmit to the printing device the print job which is designated in the designation receiving process and stored in the server memory,
   wherein the first controller is configured to further perform:
   a second print job receiving process to receive the print job which is transmitted in the second print job transmitting process; and
   a print process to perform printing the print job, which is received in the second print job receiving process, on a print medium by controlling the printing member.

17. The printing system according to claim 16, wherein the printing device further comprises a device memory,
   wherein the first controller is configured to further perform:
   starting storing the acquired print job in the device memory,
   wherein in the first print job transmitting process, the first controller starts transmitting the print job to the data processing server before storing the acquired print job in the device memory is completed.

18. The printing system according to claim 17, wherein the second controller is configured to further perform:
   a fee determining process to determine a fee to be charged for execution of the print job received in the first print job receiving process; and
   associating job identification information identifying the print job received in the first print job receiving process with the fee determined in the fee determining process.

19. The printing system according to claim 18, wherein the first controller is configured to further perform:
   a job identification information transmitting process to transmit to the data processing server the job identification information identifying the print job for which printing is completed in the print process, wherein the second controller is configured to further perform:
- a print job deleting process to delete from the server memory the print job which is identified by the job identification information transmitted in the job identification information transmitting process.

20. The printing system according to claim 18, wherein the printing device further comprises a display,
wherein the first controller is configured to further perform:
- a print job display process to display information on one or more print jobs as candidates for printing on the display, the one or more print jobs including the print job stored in the server memory in the print job storing process,
wherein in the designation receiving process, the first controller receives the designation of the print job among the one or more print jobs included in the displayed information.

21. The printing system according to claim 20, wherein in the print job display process, the first controller displays the information on the one or more print jobs and one or more fees each corresponding to one of the one or more print jobs.

* * * * *